(12) United States Patent
Lee et al.

(10) Patent No.: US 10,677,088 B2
(45) Date of Patent: Jun. 9, 2020

(54) WIRELESS MONITORING SYSTEM FOR ROTARY MACHINES

(71) Applicant: General Electric Company, Schenectady, NY (US)

(72) Inventors: Yongjae Lee, Latham, NY (US); Joseph Alfred Iannotti, Glenville, NY (US); Filippo Gerbi, Prato (IT)

(73) Assignee: NUOVO PIGNONE TECHNOLOGIE SRL, Florence (IT)

( * ) Notice: Subject to any disclaimer, the term of this patent is extended or adjusted under 35 U.S.C. 154(b) by 331 days.

(21) Appl. No.: 15/078,344

(22) Filed: Mar. 23, 2016

(65) Prior Publication Data

US 2017/0276020 A1   Sep. 28, 2017

(51) Int. Cl.
| | |
|---|---|
| *F01D 21/00* | (2006.01) |
| *F03D 17/00* | (2016.01) |
| *F01D 5/12* | (2006.01) |
| *F04D 27/00* | (2006.01) |
| *G01L 9/00* | (2006.01) |
| *G01H 1/00* | (2006.01) |
| *B64F 5/60* | (2017.01) |

(52) U.S. Cl.
CPC .............. *F01D 21/003* (2013.01); *B64F 5/60* (2017.01); *F01D 5/12* (2013.01); *F03D 17/00* (2016.05); *F04D 27/001* (2013.01); *G01H 1/006* (2013.01); *G01L 9/0025* (2013.01)

(58) Field of Classification Search
CPC ....... F01D 21/003; F01D 5/12; G01L 9/0025; F03D 17/00; F04D 27/001; B64F 5/0045; B64F 1/005; G01H 1/006; G01H 1/003; G01M 13/045; G01M 15/12; G01N 29/36

USPC ........... 73/660, 659, 655, 579, 760; 374/117
See application file for complete search history.

(56) References Cited

U.S. PATENT DOCUMENTS

| | | | |
|---|---|---|---|
| 4,896,537 | A | 1/1990 | Osborne |
| 5,010,769 | A | 4/1991 | King et al. |
| 5,761,956 | A | 6/1998 | Beeson et al. |
| 6,263,738 | B1 | 7/2001 | Hogle |
| 7,849,752 | B2 | 12/2010 | Gregory et al. |

(Continued)

OTHER PUBLICATIONS

Beacon signals: what, why, how, and where? by Gerasenko et al. (Computer, vol. 34, Issue: 10, pp. 108-110, Oct. 2001) (Year: 2001).*

(Continued)

*Primary Examiner* — Natalie Huls
*Assistant Examiner* — Suman K Nath
(74) *Attorney, Agent, or Firm* — Baker Hughes Patent Organization

(57) ABSTRACT

A monitoring system for monitoring environmental conditions for rotary members includes a plurality of stationary reader antennas positioned proximate rotary members. A first sensor is coupled to a first rotary member and a second sensor is coupled to a second rotary member. Each sensor is configured to generate environmental condition data. A key phasor is coupled to a third rotary member and configured to generate key phasor data. The monitoring system also includes a data integrator communicatively coupled to each stationary reader antenna and configured to determine measurement values for the first and second environmental condition based on raw data from each stationary reader antennas and data from the key phasor.

19 Claims, 7 Drawing Sheets

(56) References Cited

U.S. PATENT DOCUMENTS

| | | | |
|---|---|---|---|
| 8,111,161 | B2 | 2/2012 | Lee |
| 8,348,504 | B2 | 1/2013 | Gregory et al. |
| 8,527,241 | B2 | 9/2013 | Mitchell et al. |
| 2011/0102261 | A1* | 5/2011 | Egri ............... H01Q 1/241 |
| | | | 342/371 |
| 2014/0052410 | A1 | 2/2014 | Tralshawala et al. |
| 2015/0013461 | A1 | 1/2015 | Pollard et al. |
| 2015/0028889 | A1 | 1/2015 | Gong et al. |
| 2016/0209264 | A1* | 7/2016 | Berkcan ............ F01D 21/00 |

OTHER PUBLICATIONS

International Search Report and Written Opinion issued in connection with corresponding PCT Application No. PCT/US2017/015703 dated Apr. 13, 2017.

Xinhua Ren et al., "Wireless resonant frequency detection of SiCN ceramic resonator for sensor applications", Antennas and Propagation (APSURSI), 2011 IEEE International Symposium on, pp. 1856-1859, Jul. 3-8 2011, Spokane, WA.

Fang Li et al., "Wireless surface acoustic wave radio frequency identification (SAW-RFID) sensor system for temperature and strain measurements", Ultrasonics Symposium (IUS), 2011 IEEE International, pp. 822-825, Oct. 18-21 2011, Orlando, FL.

* cited by examiner

WIRELESS MONITORING SYSTEM FOR ROTARY MACHINES

BACKGROUND

The field of the disclosure relates generally to a turbine engine, and more particularly, to turbine bucket diagnostics, including the usage of a passive wireless sensing system that may be used in diagnostic applications for a gas turbine engine.

Known gas turbine engines typically include a compressor and a turbine, each with a series of alternating stator buckets (i.e., blades, members) and rotor buckets. During operation of a gas turbine engine, turbine buckets are exposed to and become highly stressed under harsh environmental conditions, such as extreme temperatures, high velocity working fluids, high velocity air flow, high rotational velocities and vibrations. Given these conditions, it is important for turbine rotor bucket health to be monitored closely. Generally, bucket failures may be prevented through proper monitoring of strain levels and crack formation in highly stressed areas on the bucket and through the collection of sufficiently precise and accurate bucket data (e.g., temperature, strain, vibration, or any other mechanical parameters).

Conventional bucket monitoring systems may measure the temperature at the inlet and outlet of both the compressor and the turbine, and some known systems measure the temperature of internal components of the gas turbine engine. Some known systems include a thermocouple sensor to measure temperature of the internal components. However, known thermocouple sensors only gather data from discrete points inside the gas turbine engine, which may not provide enough data for an adequate thermal analysis of the gas turbine engine. Alternatively, some known systems employ infrared cameras to measure temperature of the internal components from locations external to the gas turbine engine through a borescope. However, these known systems also limit the amount of data that can be gathered about the internal components. Other known systems employ fiber optic sensors to measure temperature. However, known fiber optics do not provide sufficient resolution to consistently measure temperature of the internal components. To measure vibration, for example, tip timing is a conventional method that measures bucket vibration frequency. Generally, the presence of a crack alters the operating vibration frequency of a bucket and indicates that a bucket is compromised. However, results from this method have proved unreliable in many applications. Another more expensive and time consuming conventional method to determine cracks includes shutting down the turbine engine and visually inspecting the buckets. This type of inspection, though, provides no information about the stress occurring during operation, is prone to unreliability, and is very expensive because of both the required labor and the need to shut down the engine. Moreover, many conventional monitoring systems begin to fail during exceedingly fast rotating applications (e.g., greater than 5000 RPM).

BRIEF DESCRIPTION

In one aspect, a monitoring system is provided. The monitoring system includes a plurality of stationary reader antennas positioned proximate a plurality of rotary members, a first sensor antenna, and a first sensor communicatively coupled to the first sensor antenna. The first sensor is coupled to a first rotary member of the plurality of rotary members and is configured to generate at least first environmental condition data. The first sensor antenna is configured to communicatively couple with the each stationary reader antenna. The monitoring system also includes a second sensor antenna and a second sensor communicatively coupled to the second sensor antenna. The second sensor is coupled to a second rotary member of the plurality of rotary members and is configured to generate at least second environmental condition data. The second sensor antenna is configured to communicatively couple with the each stationary reader antenna. Moreover, the first sensor and the second sensor generate environmental condition data utilizing a substantially identical resonance frequency.

In another aspect, a rotary machine is provided. The rotary machine includes a rotatable shaft, a plurality of rotary members coupled to the rotatable shaft, and a monitoring system. The monitoring system includes a plurality of stationary reader antennas positioned proximate a plurality of rotary members, a first sensor antenna, and a first sensor communicatively coupled to the first sensor antenna. The first sensor is coupled to a first rotary member of the plurality of rotary members and is configured to generate at least first environmental condition data. The first sensor antenna is configured to communicatively couple with the each stationary reader antenna. The monitoring system also includes a second sensor antenna and a second sensor communicatively coupled to the second sensor antenna. The second sensor is coupled to a second rotary member of the plurality of rotary members and is configured to generate at least second environmental condition data. The second sensor antenna is configured to communicatively couple with the each stationary reader antenna. Moreover, the first sensor and the second sensor generate environmental condition data utilizing a substantially identical resonance frequency In a further aspect, a method of monitoring environmental conditions for a plurality of rotary members is provided. The method includes generating first environmental condition data with a first sensor. The first sensor is coupled to a first rotary member of a plurality of rotary members and is communicatively coupled to a first sensor antenna. The method includes generating second environmental condition data with a second sensor. The second sensor is coupled to a second rotary member of the plurality of rotary members and is communicatively coupled to a second sensor antenna. Moreover, the first sensor and the second sensor generate environmental condition data utilizing a substantially identical resonance frequency. The method also includes receiving, at each stationary reader antenna of a plurality of stationary reader antennas, the first environmental condition data from the first sensor antenna and the second environmental condition data from the second sensor antenna. The method further includes generating, at each stationary reader antenna of the plurality of stationary reader antennas, raw data based on the first environmental condition data and the second environmental condition data. The method also includes determining measurement values for the first environmental condition and the second environmental condition based on the raw data received from each stationary reader antenna of the plurality of stationary reader antennas.

DRAWINGS

These and other features, aspects, and advantages of the present disclosure will become better understood when the following detailed description is read with reference to the accompanying drawings in which like characters represent like parts throughout the drawings, wherein.

Figure 1:
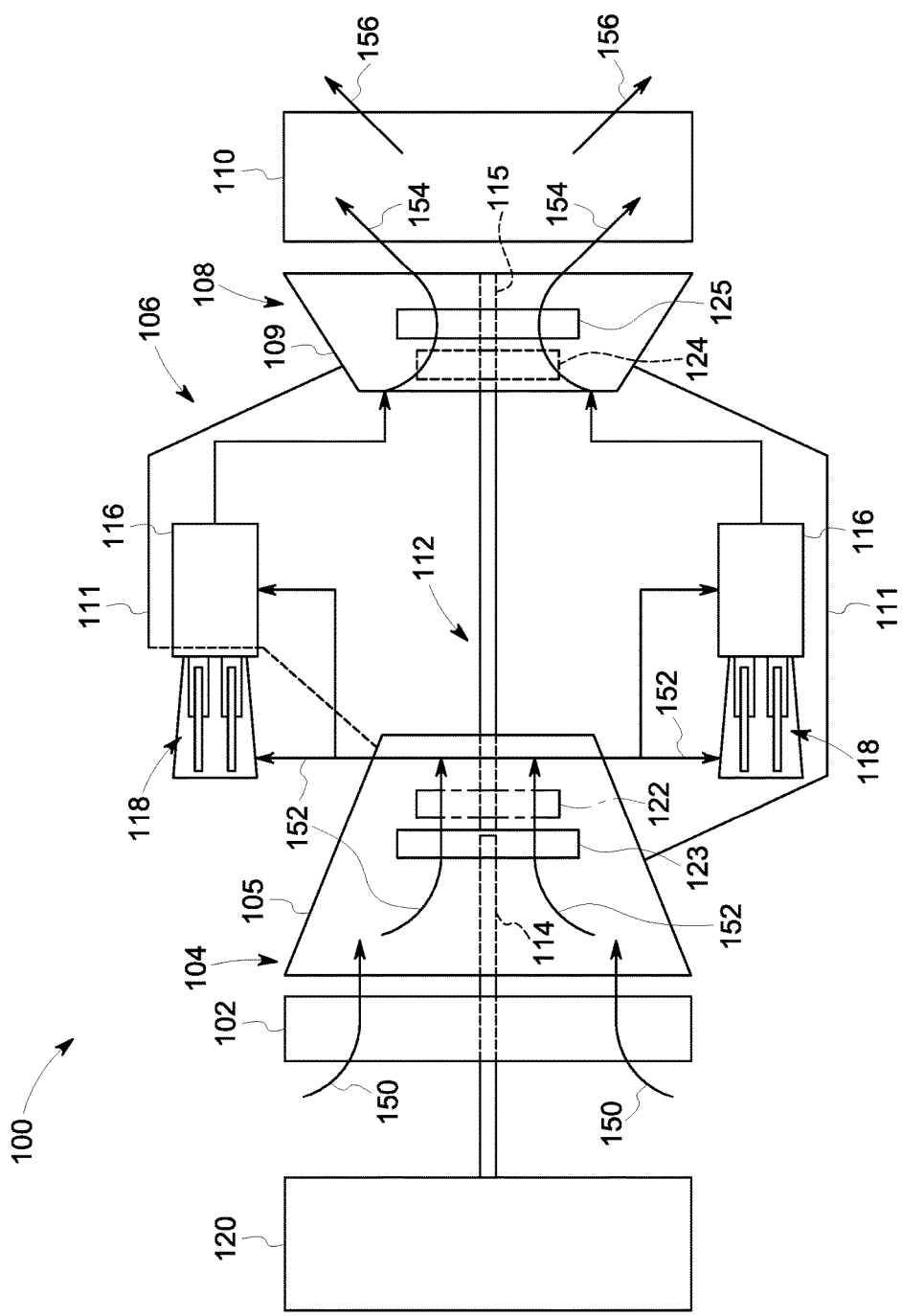
FIG. 1 is schematic diagram of an exemplary turbomachine, i.e., a gas turbine engine.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The monitoring systems described herein facilitate the measurement of one or more environmental conditions. For example and without limitation, the one or more environmental conditions include temperature, vibration, chemical contamination, heat expansion, and strain of various components, such as rotary buckets (i.e., blades, members), of a rotary machine while the rotary machine is operational. For example, the system described herein includes a plurality of rotary buckets in which some rotary buckets include an embedded or attached sensor and corresponding sensor antenna configured to facilitate measured environmental condition data to one or more stationary reader antennas and corresponding stationary readers proximate the rotary machine. For example and without limitation, the one or more stationary reader antennas and corresponding stationary readers include radiofrequency (RF) antennas and RF readers. Moreover, one or more rotary buckets may include a key phasor. For example and without limitation, the key phasor includes a beacon signal, a unique resonant frequency signal different from all other sensor resonant frequencies that generates key phasor data and facilitates the determination of position for each of the other sensors coupled to other corresponding rotary buckets. In at least one embodiment, multiple stationary readers interrogate a particular moving rotary bucket at one or more interrogation frequencies. In response to the interrogation frequency, the sensor coupled to the particular rotary bucket generates and transmits environmental condition data at a specific responsive frequency (i.e., a resonant frequency) using the sensor antenna. Each of the stationary readers, using a corresponding stationary reader antenna, receives environmental data from each sensor and generates raw data based on the received environmental condition data and key phasor data. In some embodiments, a data integrator determines measurement values for the environmental conditions based on the raw data generated by each stationary reader.

The integrated sensors and associated sensing systems described herein facilitate more precise measurement procurement during operation in harsh environments. Specifically, the sensing system herein includes a streamlined design that includes integrating sensors that operate at a substantially identical resonant frequency. By utilizing multiple sensors that all operate at a substantially identical resonant frequency, multiple readers may be utilized that are all of the same type, i.e., receiving a responsive or resonant frequency substantially at the identical frequency. This configuration, in turn, reduces the amount of time and resources expended in manufacturing "smart" buckets because similar or identical components may be utilized. Therefore, such integration of the sensors and components facilitates placing the sensors at the most appropriate and desired positions on the components while utilizing substantially similar components for ease of installation and cost reduction.

FIG. 1 is a schematic view of a rotary machine 100, i.e., a turbomachine, and more specifically, a turbine engine. In the exemplary embodiment, turbine engine is a gas turbine engine. Alternatively, turbine engine is any other turbine engine and/or rotary machine, including, without limitation, a steam turbine engine, an aircraft engine, a wind turbine, and a compressor. In the exemplary embodiment, gas turbine engine system 101 is a land-based gas turbine. Alternatively, gas turbine engine system 101 includes any gas turbine engine that enables operation of system 101 as described herein, including, without limitation, naval gas turbines and aircraft engines. In the exemplary embodiment, gas turbine engine system 101 includes a gas temperature measurement system 102. Gas temperature measurement system 102 may be used in any other facilities and with any other apparatus and processes that use gas temperature measurements, e.g., without limitation, power and auxiliary boilers, other turbomachinery, chemical processing plants, including, without limitation, refining plants, and solar collectors.

In the exemplary embodiment, gas turbine engine includes an air intake section 102, and a compressor section 104 that is coupled downstream from, and in flow communication with, intake section 102. Compressor section 104 is enclosed within a compressor casing 105. A combustor section 106 is coupled downstream from, and in flow communication with, compressor section 104, and a turbine section 108 is coupled downstream from, and in flow communication with, combustor section 106. Turbine engine is enclosed within turbine casing 109 and includes an exhaust section 110 that is downstream from turbine section 108. A combustor housing 111 extends about combustor section 106 and is coupled to compressor casing 105 and turbine casing 109. Moreover, in the exemplary embodiment, turbine section 108 is coupled to compressor section 104 via a rotor assembly 112 that includes, without limitation, a compressor rotor, or compressor drive shaft 114 and a turbine rotor, or rotatable drive shaft 115.

In the exemplary embodiment, combustor section 106 includes a plurality of combustor assemblies, i.e., combustors 116 that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a load 120 via drive shaft 114. For example, load 120 may include, without limitation, an electrical generator and/or a mechanical drive application, e.g., a pump. Alternatively, gas turbine engine may be an aircraft engine. In the exemplary embodiment, compressor section 104 includes at least one compressor blade assembly 122, i.e., blade 122 and at least one adjacent stationary vane assembly 123.

Also, in the exemplary embodiment, turbine section 108 includes at least one turbine blade assembly, i.e., bucket 124 and at least one adjacent stationary nozzle assembly 125. Each compressor blade assembly 122 and each turbine bucket 124 is coupled to rotor assembly 112, or, more specifically, compressor drive shaft 114 and rotatable turbine drive shaft 115.

In operation, air intake section 102 channels air 150 towards compressor section 104. Compressor section 104 compresses inlet air 150 to higher pressures and temperatures prior to discharging compressed air 152 towards combustor section 106. Compressed air 152 is channeled to fuel nozzle assembly 118, mixed with fuel (not shown), and burned within each combustor 116 to generate combustion gases 154 that are channeled downstream towards turbine section 108. Combustion gases 154 generated within combustors 116 are channeled downstream towards turbine section 108. After impinging turbine bucket 124, thermal energy is converted to mechanical rotational energy that is used to drive rotor assembly 112. Turbine section 108 drives compressor section 104 and/or load 120 via drive shafts 114 and 115, and exhaust gases 156 are discharged through exhaust section 110 to ambient atmosphere.

Figure 2:
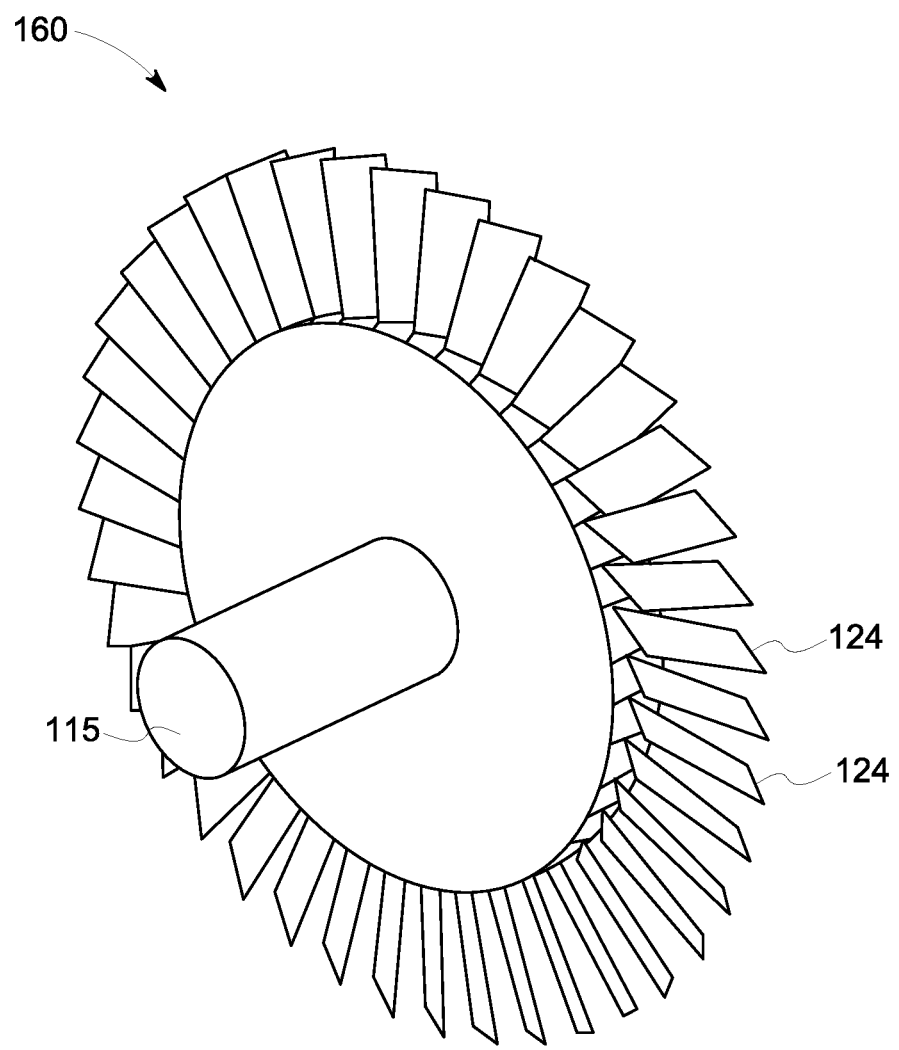
FIG. 2 is a schematic perspective view of an exemplary simplified model of rotary assembly.

FIG. 2 is a schematic perspective view of an exemplary simplified model of a rotary assembly 160 that may be utilized, for example, in a turbine engine, compressor, gas turbine, motor, or any other rotary application. In the exemplary embodiment, rotatable turbine drive shaft 115 is coupled to a plurality of rotary buckets 124. Rotary buckets 124 may facilitate the flow of air, gas, oil, or any other suitable substance exposed to harsh environmental conditions, such as, without limitation, temperature, vibration, torque, chemical contamination, heat expansion, and strain.

Figure 3:
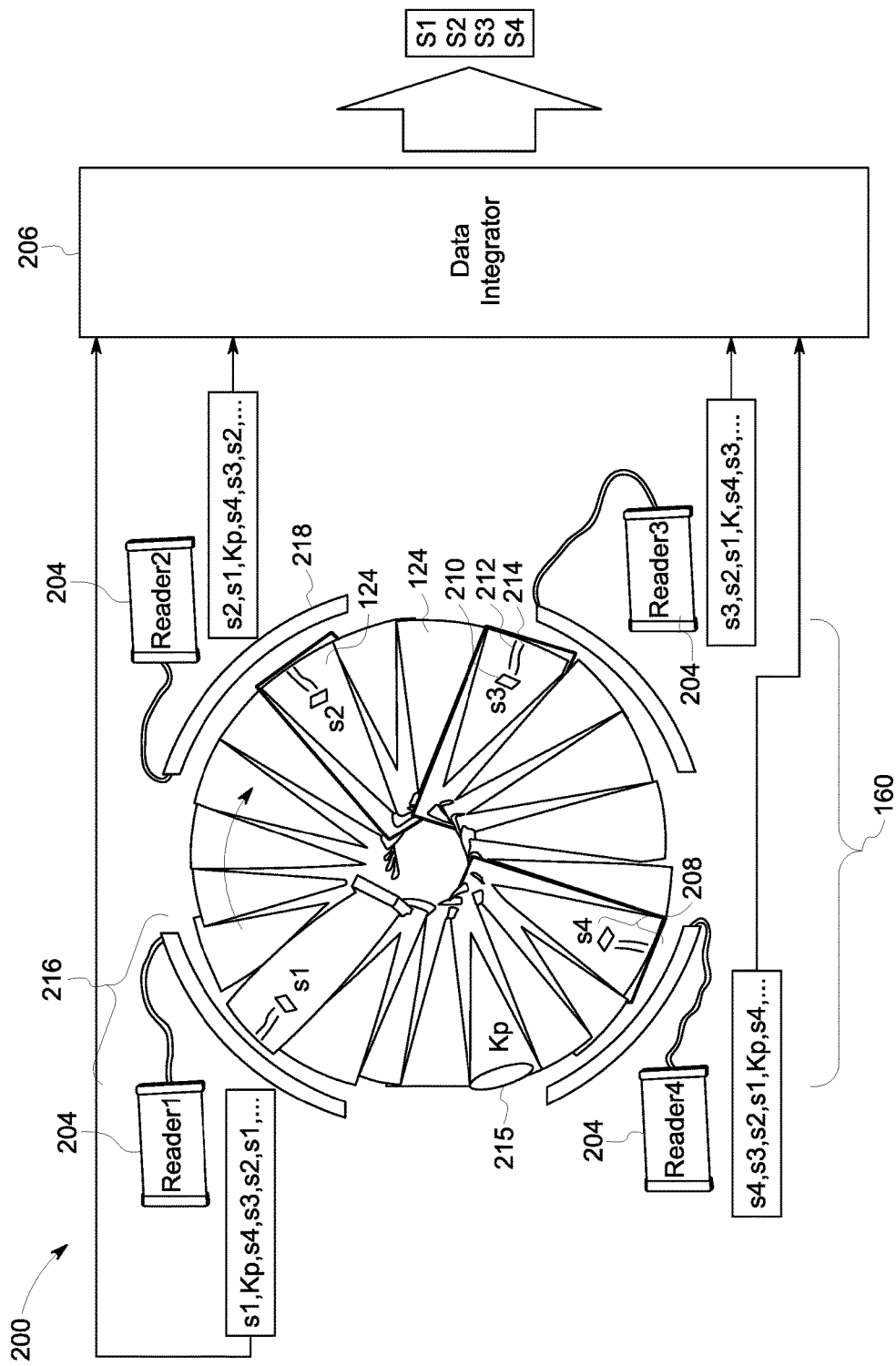
FIG. 3 is a schematic view of an exemplary monitoring system that may be used with the rotary assembly shown in FIG. 1.

FIG. 3 is a schematic view of an exemplary monitoring system 200 that may be used to monitor environmental conditions of one or more rotary buckets 124 (shown in FIG. 1) of rotor assembly 160 (shown in FIG. 2). Monitoring system 200 includes bucket sensor assemblies 208, key phasor bucket assembly 215 (that includes a key phasor and key phasor antenna), stationary reader assemblies 216, and data integrator 206 that is communicatively coupled to each stationary reader assembly 216. Bucket sensor assemblies 208 may also be coupled to various components operating in the gas paths of rotary machine 100, such as, but not limited to, stationary surfaces, e.g., compressor vanes, cooling apertures, turbine nozzles, and turbine exhausts, and rotatable surfaces, e.g., land-based turbine buckets, aircraft engine blades, and compressor/fan blades. Furthermore, although FIG. 3 depicts each bucket sensor assembly 208 being situated equidistant from a neighboring bucket sensor assembly 208, bucket sensor assemblies 208 may be distributed unevenly such that each bucket sensor assembly 208 may be situated with any amount of spacing between other bucket sensor assemblies 208. For example and without limitation, all four bucket sensor assemblies 208 may be placed relatively close to each other on one side of the rotor assembly 160. Generally, in some embodiments, one or more stationary reader assemblies 216 may interrogate, i.e., transmit one or more interrogation signals at one or more frequencies, bucket sensor assemblies 208 and key phasor bucket assembly 215 to induce a responsive signal from each bucket sensor assembly 208 and key phase bucket assembly 215. In turn, stationary reader assemblies 216 each receive these responsive signals that contain "raw data" which includes a "stream" of environmental condition data from successive multiple bucket sensor assemblies 208 and key phasor bucket assembly 215 as rotary machine 100 (shown in FIG. 1) rotates (discussed further below) and convey the raw data to data integrator 206. In some embodiments, each bucket sensor assembly 208 may propagate a responsive signal at resonant frequency, i.e., responsive frequency, that is identical to the resonant frequency of each other bucket sensor assembly 208. After the responsive signals are transmitted, in some implementations, stationary reader assemblies 216 may process the received responsive signals into uncalibrated raw data before propagating the information or uncalibrated raw data to the data integrator 206. Importantly, data integrator 206 accumulates the raw or uncalibrated raw data from each spatially positioned stationary reader assembly 208 and the key phasor data, i.e., positioning data, from key phasor assembly 215 and determines measurement values for each sensor based on the uncalibrated raw data. Data integrator 206 may be implemented by a software module executed by a process or a microcontroller. Alternatively, data integrator 206 may be implemented entirely on a field programmable gate array (FPGA) or any other suitable method of implementing data integrator 206.

Figure 4:
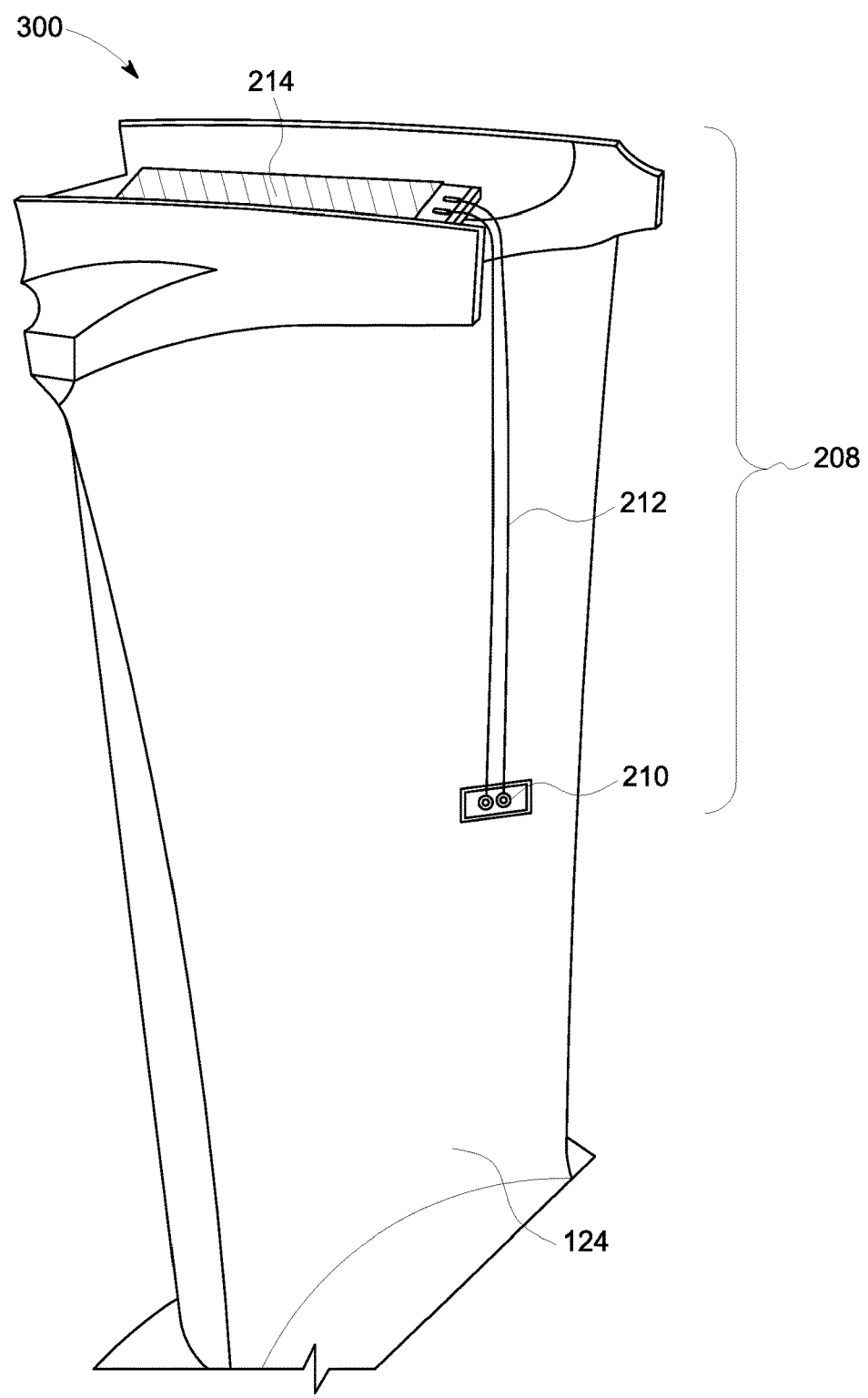
FIG. 4 is a schematic perspective view of an exemplary rotary bucket shown in FIGS. 1 and 2 including a bucket sensor assembly of the monitoring system shown in FIG. 2.
Figure 5:
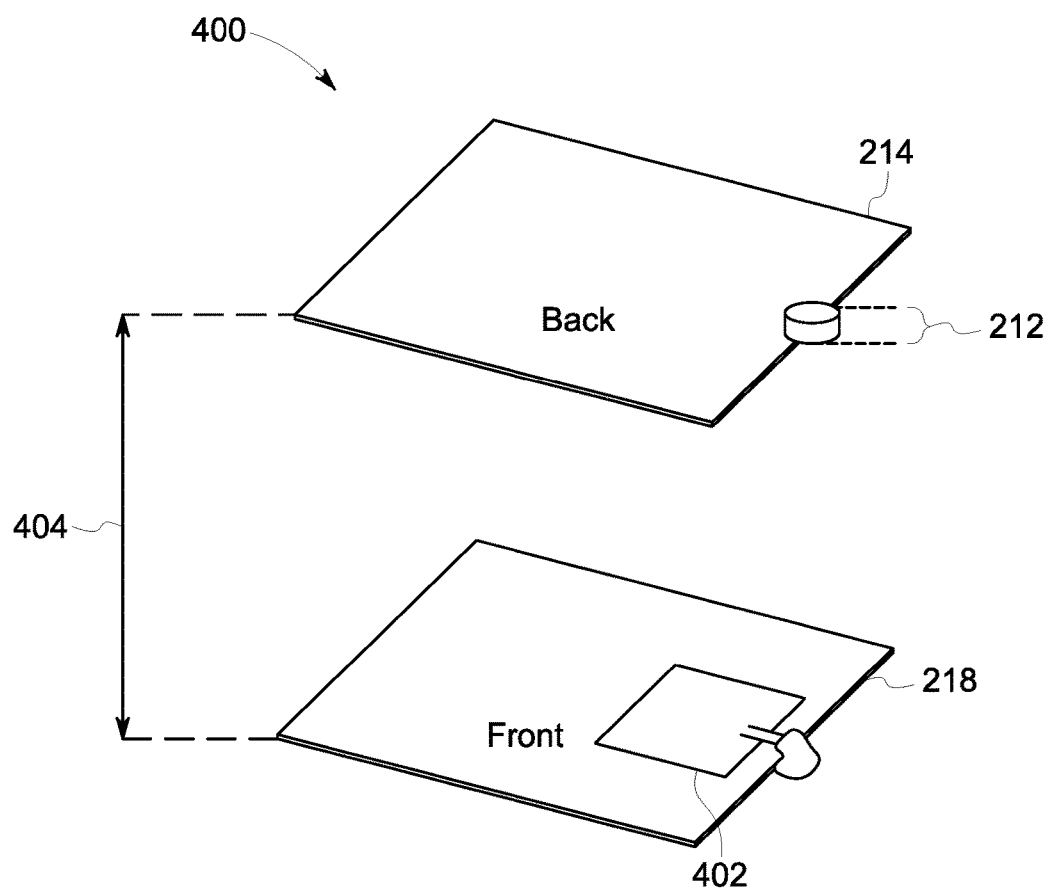
FIG. 5 is a schematic perspective view of an exemplary sensor antenna located at an edge of a rotary bucket shown in FIG. 3 and a stationary reader antenna.
Figure 6:
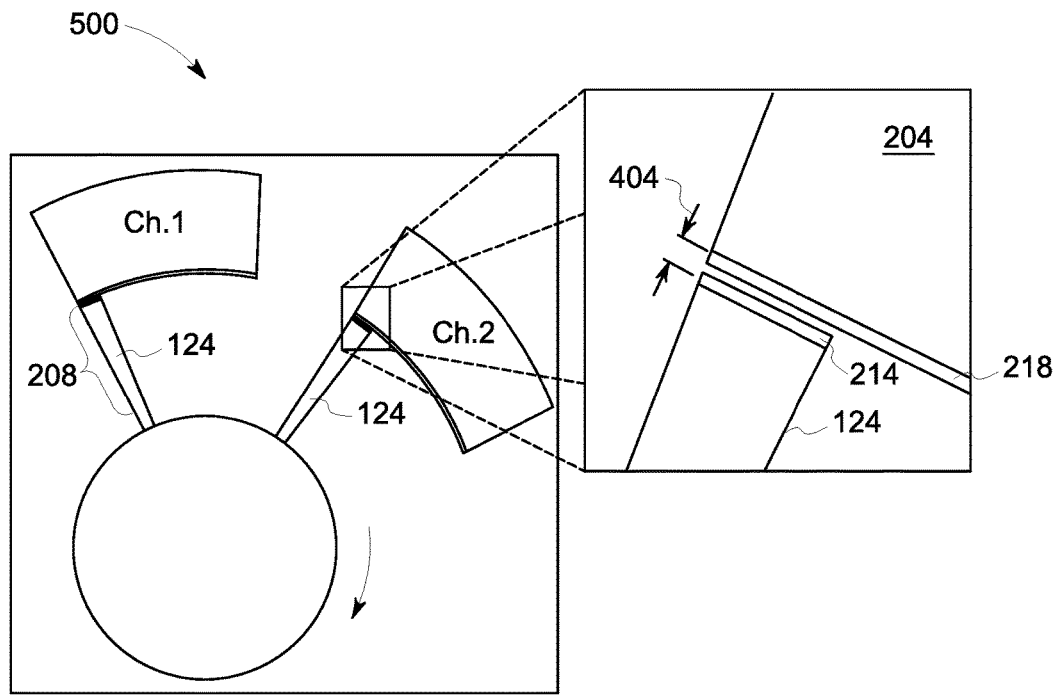
FIG. 6 is schematic view of a portion of the monitoring system shown in FIG. 2.

FIG. 4 is a schematic perspective view 300 of an exemplary rotary bucket 124 that includes a bucket sensor assembly 208 that includes sensor 210 that is communicatively coupled to sensor antenna 214 by coupling connection 212. In some embodiments, sensor antenna 214 may include, for example and without limitation, an active antenna that includes a power source, a passive sensor (discussed below), a patch antenna of any shape, such as a rectangular patch antenna, circular patch antenna, square patch antenna, or a folded dipole. Moreover, sensor antenna 214 may include, for example and without limitation, a near-field coupler or far-field coupler, as shown in FIGS. 5 and 6. In some embodiments, sensor 210 is a passive sensor, i.e., it includes no on-board power supplies and is in a dormant condition until it is illuminated. Sensor 210 operates with passive sensor antenna 214 such that when sensor antenna 214 receives an interrogation signal at a particular frequency, sensor antenna 214 facilitates the signal energy to sensor 210 through coupling connection 212. For example and without limitation, the interrogation signal may be at 400 MHz. Sensor 210 absorbs some RF energy and generates environmental condition data in response. Sensor 210 may generate environmental condition data by any suitable sensing method or manner. For example and without limitation, environmental condition data includes temperature, vibration, chemical contamination, heat expansion, and strain. For example and without limitation, sensor 210 may include one or more strain gauges, one or more all-quartz-package (AQP) surface acoustic wave (SAW) sensors that may utilize piezoelectric substrates, input transducers, and/or output transducers to sense an environmental condition, i.e., physical phenomenon, through the modulation of surface acoustic waves propagating through a rotary bucket 124. Sensor 210 may generate environmental condition data by transducing an electric signal that encodes the environmental condition data based on the acoustic signals detected from the rotary bucket 124. This electrical signal containing the environmental condition data may be communicated along coupling connection 212 to sensor antenna 214 for wireless propagation to one or more stationary reader antennas 218 which are communicatively coupled with data integrator 206. For example and without limitation, coupling connection 212 includes dual wire RF terminals. Alternatively, one or more key phasors and/or key phasor antenna may be coupled with one or more sensor assemblies 208. For example and without limitation, bucket sensor assembly 208 as shown in FIG. 4, may include one or more of sensor 210, coupling connection 212, sensor antenna 214, key phasor (not shown), key phasor coupling connection (not shown), and key phasor antenna (not shown). Furthermore, some embodiments may include multiple rotary assemblies 160 in which each rotary assembly is fixed to the same rotatable shaft 115 and each rotary assembly rotates at the same angular rotation. In this embodiment, the key phasor data may be generated by another rotary assembly 160 and the key phasor data propagated to the stationary data readers 204 or the data integrator 206. In this embodiment, the rotary assembly 160 as shown in FIG. 3, does not require the key phasor bucket assembly 215 because the key phasor data is obtained from another rotary assembly that includes a key phasor and is fixed to the same rotatable drive shaft 115.

Although FIG. 4 illustrates sensor antenna 214 positioned at the edge or end of bucket 124, in some embodiments, sensor antenna 214 may be situated or positioned on the face of bucket 124 (running parallel with sensor 210). In this embodiment, sensor antenna 214 may be embedded into bucket 124 such that operation and aerodynamics of bucket 124 are not affected. For example and without limitation for this embodiment, sensor antenna 214 may include a patch antenna of any shape such that the patch antenna does not significantly protrude above the surface of bucket and does not affect the operation of bucket 124. In this embodiment, stationary reader antenna 218 (discussed below) may be positioned or affixed, for example and without limitation, to turbine casing 109.

FIG. 5 is a schematic perspective view 400 of an exemplary sensor antenna 214 located at an edge of rotary bucket 124 (not shown) and of stationary reader antenna 218. Both antennas 214 and 218 may serve both as a transmitter and a receiver depending on timing and functionality. In some embodiments, each of the sensor antenna 214 and stationary reader antenna 218 are identical "patch" antennas that run substantially parallel to each other such that the RF energy may propagate orthogonally to the face of sensor antenna 214 and the face of stationary reader antenna 218. Stationary reader antenna 218 may include an RF excitation region 402 where the interrogation signal may be propagated or transmitted to sensor antenna 214. Alternatively, stationary reader antenna 218 and stationary data reader 204 may both transmit interrogation signals at multiple frequencies, such as "sweeping" a band of frequencies to receive multiple resonant frequency responses from the sensor. Moreover, stationary reader antenna 218 and stationary data reader 204 may receive environmental condition data up to, for example and without limitation forty samples for each pass of a sensor 210 and may receive signals in a narrow bandwidth (for example and without limitation, 1-2 MHz) around a particular responsive frequency (for example and without limitation, 400 MHz). These sample rates, bandwidth frequency, and responsive frequency may be predetermined or dynamically determined at any suitable sample rate, frequency bandwidth, and responsive frequency, respectively.

Sensor antenna 214 and stationary reader antenna 218 may be situated at different distances to create a gap 404 of varying size between the two antennas. The width of gap 404 may be determined based on impedance variation of sensor 210 or to create sufficient RF channel-to-channel isolation. For example, each stationary reader antenna 218 may be aligned with a RF channel sufficiently distant from a neighboring stationary antenna 218 such that the interference between the two channels are kept at a minimum despite each sensor operating at an identical resonant frequency. Advantageously, because each stationary data reader 204 is sufficiently spatially distant from each other stationary reader 104, each sensor 210 may operate at the identical resonant frequency with minimal interference. A single reader would not be able to isolate these channels for multiple sensors that are all operating at an identical resonant frequency.

For example and without limitation, FIG. 6 is schematic view of a portion of the monitoring system 200 that illustrates channel-to-channel isolation achieved by utilizing two sensors (not shown) operating at an identical resonant frequency and both sensors (not shown) situated on spatially distant rotary buckets 124. Each stationary data reader 204 (through stationary reader antenna 218) receives environmental condition data from each bucket sensor assembly 208 as each bucket sensor assembly 208 passes by each stationary reader 104. For example and without limitation, rotary assembly 160 rotates in a clockwise fashion as shown in FIG. 6. In addition to the spatial distance of each bucket sensor assembly 208, the gap 404 distance between sensor antenna 214 and stationary reader antenna 218 additionally affects the channel-to-channel isolation gain levels.

Figure 7:
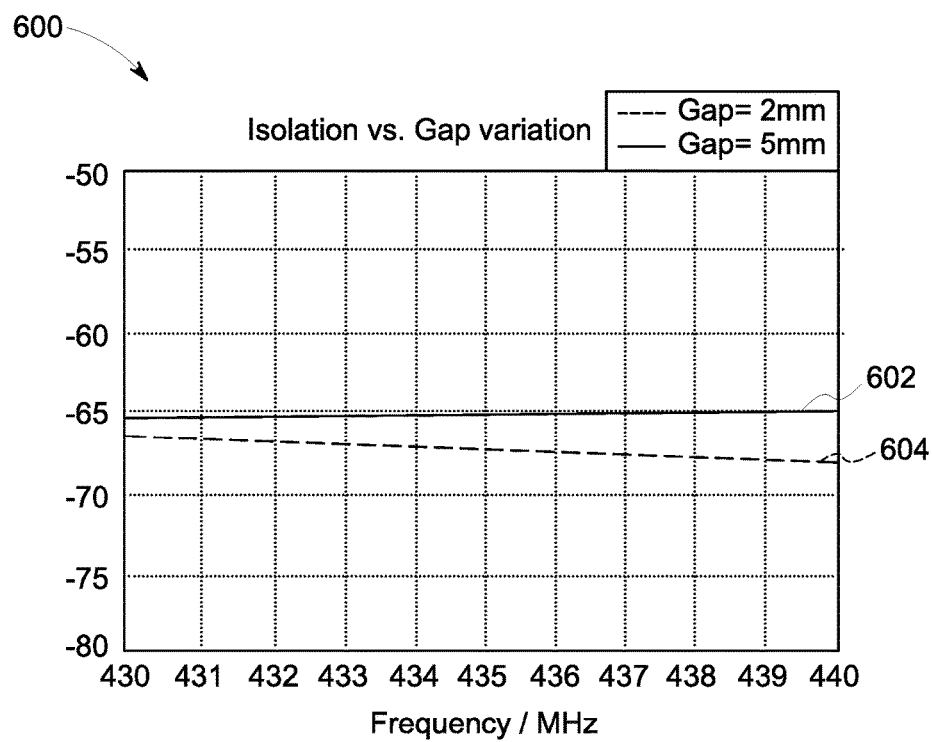
FIG. 7 is a graphical view of channel-to-channel isolation gain for two different exemplary gap distances between a sensor antenna and a reader antenna shown in FIG. 5.

FIG. 7 is a graphical view of the channel-to-channel isolation difference for two different exemplary gap 404 distances (shown in FIG. 5). FIG. 7 includes a channel-to-channel isolation graph 600 that includes a y-axis defining a linear representation of channel-to-channel isolation gain or power in decibels (dB) from −80 dB to −55 dB. Graph 600 also includes an x-axis defining a linear representation of frequency (MHz) from 430 MHz to 440 MHz. Additionally, graph 600 includes a two channel-to-channel isolation vs. frequency curves for two different gap distance 404 variations between sensor antenna 214 and stationary reader antenna 218. The uppermost curve is a 5 mm gap curve 602 that represents the channel-to-channel isolation response at different frequencies when the gap distance 404 (shown in FIG. 6) is approximately 5 millimeters. The lowermost curve is a 2 mm gap curve 604 that represents the channel-to-channel isolation response at different frequencies when the gap distance 404 is approximately 2 millimeters. As shown in FIG. 7, a gap distance (shown in FIG. 5) of 5 mm maintains better channel-to-channel isolation across a greater range of frequencies than a plotline 604 representing a gap distance 404 of 2 mm.

Because monitoring system 200, referring to FIG. 3, is configured to maintain sufficient channel-to-channel isolation because of spatially distant sensors 210 with sufficient gap between sensor antenna 214 and stationary reader antenna 218, the key phasor data transmitted by key phasor 215 facilitates positioning the order of each sensor 210. For example and without limitation, the key phasor includes a beacon signal, a unique resonant frequency signal different from all other sensor resonant frequencies that generates key phasor data and facilitates the determination of position each the other sensor coupled to other rotary buckets. For example, as shown in FIG. 1, each of the four sensors 210 (any number of sensors 210 may be used, for example, two, six, eight, etc.) are labeled S1, S2, S3, and S4 while key phasor 215 is labeled Kp. Thus, as the rotary assembly rotates clockwise, in this example, each stationary reader assembly 216 receives environmental condition data from a different bucket sensor assembly 208. For example, stationary reader assembly #1 receives a signal from sensor S1 at the first time, stationary reader assembly #2 receives a signal from sensor S2 at the first time, stationary reader assembly #3 receives a signal from sensor S3 at the first time, and stationary reader assembly #4 receives a signal from sensor S4 at the first time. After the rotary assembly rotates clockwise, stationary reader assembly #1 receives a signal from sensor Kp at this second time, i.e., the first time in addition to the time period required to rotate the rotary assembly to the subsequent stationary reader assembly 216, stationary reader assembly #2 receives a signal from sensor S1 at the second time, stationary reader assembly #3 receives a signal from sensor S2 at the second time, and so on.

Figure 8:
FIG. 8 is a table of exemplary signal readings from different stationary readers shown in FIG. 3.

FIG. 8 is a table of exemplary signal readings from different stationary readers shown in FIG. 3 by each stationary reader assembly 216. As shown in FIG. 3, these sequences of received signals from each sensor 124 are output to data integrator 206. Data integrator 206 may receive the environmental condition data in a raw data format or in an uncalibrated or unfiltered format depending whether stationary data reader 204 performed processing. In one embodiment, data integrator 206 may determine the position of each sensor based on the location of the key phasor data within the raw data input received from each stationary reader assembly 216. For example, data integrator 206 may initially adjust calibration coefficients based on the known key phasor frequency, noise, etc. to generate a baseline that may be used for an imminent sampling session. After determining a baseline, calibrating the incoming raw data, and determining the position of each sensor based on the key phasor data location, data integrator 206 determines the environmental condition measurement values for each sensor 210 and outputs the measurement data to one or more of a user interface and an output file.

The above described monitoring systems described herein facilitate the measurement of one or more environmental conditions. For example and without limitation, the one or more environmental conditions include temperature, vibration, chemical contamination, heat expansion, and strain of various components, such as rotary buckets, of a rotary assembly while the rotary assembly is operational. For example, the system described herein includes a plurality of rotary buckets in which some rotary buckets include an embedded or attached sensor and corresponding sensor antenna configured to facilitate measured environmental condition data to one or more stationary reader antennas and corresponding stationary readers proximate the rotary machine. For example and without limitation, the one or more stationary reader antennas and corresponding stationary readers include radiofrequency (RF) antennas and RF readers. Moreover, one or more rotary buckets may include a key phasor. For example and without limitation, the key phasor includes a beacon signal, a unique resonant frequency signal different from all other sensor resonant frequencies that generates key phasor data and facilitates the determination of position each the other sensor coupled to other rotary buckets. In at least one embodiment, multiple stationary readers may interrogate a particular moving rotary bucket at one or more interrogation frequencies. In response to the interrogation frequency, the sensor coupled to the particular rotary bucket generates and transmits environmental condition data at a specific responsive frequency (i.e., a resonant frequency) using the sensor antenna. Each of the stationary readers, using a corresponding stationary reader antenna, receives environmental data from each sensor and generates raw data based on the received environmental condition data and key phasor data. In some embodiments, a data integrator determines measurement values for the environmental conditions based on the raw data generated by each stationary reader.

The integrated sensors and associated sensing systems described herein facilitate more precise measurement procurement during operation in harsh environments. Specifically, the sensing system herein includes a streamlined design that includes integrating sensors that operate at a substantially identical resonant frequency. By utilizing multiple sensors that all operate at a substantially identical resonant frequency, multiple readers may be utilized that are all of the same type, i.e., receiving a responsive or resonant frequency substantially at the identical frequency. This configuration, in turn, reduces the amount of time and resources expended in manufacturing "smart" buckets because similar or identical components may be utilized. Therefore, such integration of the sensors and components facilitates placing the sensors at the most appropriate and desired positions on the components while utilizing substantially similar components for ease of installation and cost reduction.

An exemplary technical effect of the methods, system, and apparatus described herein includes at least one of: (a) utilizing sensors and stationary readers that propagate or process sensor data, respectively, at an identical resonant frequency; integrating environmental condition sensors, for example and without limitation, temperature, vibration, heat expansion, strain, chemical contamination sensors within rotary components that more precisely measure conditions; (b) enabling measuring the environmental conditions of multiple components nearly simultaneously; and (c) enabling inspection of the internal components of the rotary assembly while in operation and in near real-time, which potentially decreases the frequency of maintenance and improves the service life of the rotary assembly.

Exemplary embodiments of a monitoring system are described above in detail. The monitoring system and methods of manufacturing or operating such a system and device are not limited to the specific embodiments described herein, but rather, components of systems and/or steps of the methods may be utilized independently and separately from other components and/or steps described herein. For example, the systems, apparatus, and methods may also be used in combination with other types of machines that include rotating or translating parts, and are not limited to practice with only the micro thermal imaging system described herein. Rather, the exemplary embodiment can be implemented and utilized in connection with many other applications, equipment, and systems that may benefit from using passive sensors that include the same resonant frequency.

Although specific features of various embodiments of the disclosure may be shown in some drawings and not in others, this is for convenience only. In accordance with the principles of the disclosure, any feature of a drawing may be referenced and claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A monitoring system comprising:
 a plurality of stationary reader antennas positioned proximate a plurality of rotary members;
 a first sensor assembly coupled to a first rotary member of the plurality of rotary members, the first sensor assembly including
  a first sensor antenna, and
  a first sensor communicatively coupled to said first sensor antenna, said first sensor configured to generate at least first environmental condition data, said first sensor antenna configured to communicatively couple with each stationary reader antenna of said plurality stationary reader antennas;
 a second sensor assembly coupled to a second rotary member of the plurality of rotary members, the second sensor assembly including
  a second sensor antenna, and
  a second sensor communicatively coupled to said second sensor antenna, said second sensor configured to generate at least second environmental condition data, said second sensor antenna configured to communicatively couple with each stationary reader antenna of said plurality stationary reader antennas, wherein the first sensor using the first sensor antenna and the second sensor using the second sensor antenna communicate at a responsive frequency with each stationary reader antenna of said plurality stationary reader antennas; and
 a key phasor assembly coupled to a third rotary member of the plurality of rotary members, the key phasor assembly including
  a key phasor configured to generate a beacon signal indicative of an order of a position of the first sensor assembly relative to a position of the second sensor assembly, and
  a key phasor antenna coupled to the key phasor via a key phasor coupling, said key phasor antenna configured to transmit the beacon signal to each of the plurality of stationary reader antennas at a frequency different from the responsive frequency of the first sensor and second sensor.

2. The monitoring system in accordance with claim 1, wherein the key phasor assembly is:
coupled to said first rotary member of the plurality of rotary members and the key phasor is configured to generate a beacon signal indicative of an order of a position of the first sensor assembly relative to a position of the second sensor assembly.

3. The monitoring system in accordance with claim 1, further comprising:
a data integrator communicatively coupled to said each stationary reader antenna, said each stationary reader antenna configured to generate measurement values for the first environmental condition and the second environmental condition based on received first environmental condition data from said first sensor antenna, received second environmental condition data from said second sensor antenna, and the beacon signal transmitted from said key phasor antenna.

4. The monitoring system in accordance with claim 3, wherein said data integrator is further configured to determine that the first environmental condition is associated with the first rotary member and the second environmental condition is associated with the second rotary member based on the key phasor data.

5. The monitoring system in accordance with claim 3, wherein said data integrator generates measurement values for the first environmental condition and the second environmental condition based on calibration coefficients for said first sensor and said second sensor.

6. The monitoring system in accordance with claim 1, wherein said each stationary reader antenna comprises a data reader to generate the raw data based on received first environmental condition data, received second environmental condition data, and the transmitted beacon signal.

7. The monitoring system in accordance with claim 1, wherein the first environmental condition includes at least one of temperature, vibration, and strain and the second environmental condition includes at least one of temperature, vibration, chemical contamination, heat expansion, and strain.

8. The monitoring system in accordance with claim 1, wherein said first sensor antenna comprises a first microstrip coupler antenna and said second sensor antenna comprises a second microstrip coupler antenna.

9. The monitoring system in accordance with claim 8, wherein said first microstrip coupler antenna is positioned on a most radially outward edge of a first member of the plurality of rotary members and said second microstrip coupler antenna is positioned on a most radially outward edge of a second member of the plurality of rotary members.

10. The monitoring system in accordance with claim 1, wherein the responsive frequency of the first sensor and second sensor is a resonant frequency of each respective first sensor and second sensor.

11. A rotary machine comprising:
a rotatable shaft;
a plurality of rotary members coupled to said rotatable shaft; and
a monitoring system comprising:
a plurality of stationary reader antennas positioned proximate said plurality of rotary members;
a first sensor assembly coupled to a first rotary member of the plurality of rotary members, the first sensor assembly including
a first sensor antenna, and
a first sensor communicatively coupled to said first sensor antenna, said first sensor configured to generate at least first environmental condition data, said first sensor antenna configured to communicatively couple with each stationary reader antenna of said plurality stationary reader antennas;
a second sensor assembly coupled to a second rotary member of the plurality of rotary members, the second sensor assembly including
a second sensor antenna, and
a second sensor communicatively coupled to said second sensor antenna, said second sensor configured to generate at least second environmental condition data, said second sensor antenna configured to communicatively couple with each stationary reader antenna of said plurality stationary reader antennas, wherein the first sensor using the first sensor antenna and the second sensor using the second sensor antenna communicate at a responsive frequency with each stationary reader antenna of said plurality stationary reader antennas; and
a key phasor assembly coupled to a third rotary member of the plurality of rotary members, the key phasor assembly including
a key phasor configured to generate a beacon signal indicative of an order of a position of the first sensor assembly relative to a position of the second sensor assembly, and
a key phasor antenna coupled to the key phasor via a key phasor coupling, said key phasor antenna configured to transmit the beacon signal to each of the plurality of stationary reader antennas at a frequency different from the responsive frequency of the first sensor and second sensor.

12. The rotary machine in accordance with claim 11, wherein the monitoring system further comprises:
a data integrator communicatively coupled to said each stationary reader antenna, said each stationary reader antenna configured to generate measurement values for the first environmental condition and the second environmental condition based on received first environmental condition data from said first sensor antenna, received second environmental condition data from said second sensor antenna, and the beacon signal transmitted from said key phasor antenna.

13. The rotary machine in accordance with claim 12, wherein said data integrator is further configured to determine that the first environmental condition is associated with the first rotary member and the second environmental condition is associated with the second rotary member based on the key phasor data.

14. The rotary machine in accordance with claim 11, wherein said each stationary reader antenna comprises a data reader to generate the raw data based on received first environmental condition data, received second environmental condition data, and the transmitted beacon signal.

15. The rotary machine in accordance with claim 11, wherein the first environmental condition includes at least one of temperature, vibration, and strain and the second environmental condition includes at least one of temperature, vibration, chemical contamination, heat expansion, and strain.

16. The rotary machine in accordance with claim 11, wherein said first sensor antenna comprises a first microstrip coupler antenna and said second sensor antenna comprises a second microstrip coupler antenna.

17. The rotary machine in accordance with claim 16, wherein said first microstrip coupler antenna is positioned on a most radially outward edge of a first member of the plurality of rotary members and said second microstrip coupler antenna is positioned on a most radially outward edge of a second member of the plurality of rotary members.

18. A method of monitoring environmental conditions for a plurality of rotary members, said method comprising:
generating first environmental condition data with a first sensor assembly coupled to a first rotary member of the plurality of rotary members, the first sensor assembly including a first sensor communicatively coupled to a first sensor antenna;
generating second environmental condition data with a second sensor assembly coupled to a second rotary member of the plurality of rotary members, the second sensor assembly including a second sensor communicatively coupled to a second sensor antenna;
generating a beacon signal with a key phasor configured within a key phasor assembly coupled to a third rotary member of the plurality of rotary members, the beacon signal indicative of an order of a position of the first sensor assembly relative to a position of the second sensor assembly and transmitted by a key phasor antenna coupled to the key phasor via a key phasor coupling, wherein the beacon signal is transmitted to each of a plurality of stationary reader antennas at a frequency different from a responsive frequency of the first sensor and second sensor:
receiving, at each stationary reader antenna of the plurality of stationary reader antennas, the first environmental condition data from the first sensor antenna and the second environmental condition data from the second sensor antenna, wherein the first sensor using the first sensor antenna and the second sensor using the second sensor antenna communicate at the responsive frequency with each stationary reader antenna of said plurality stationary reader antennas;
receiving, at each stationary reader antenna of the plurality of stationary reader antennas, the beacon signal transmitted from the key phasor antenna;
generating, at each stationary reader antenna of the plurality of stationary reader antennas, raw data based on the first environmental condition data, the second environmental condition data, and the beacon signal;
determining measurement values for the first environmental condition and the second environmental condition based on the raw data received from each stationary reader antenna of the plurality of stationary reader antennas.

19. The method in accordance with claim 18, further comprising:
determining the order of the position of the first sensor assembly relative to the position of the second sensor assembly based on the beacon signal within the raw data generated at each stationary reader antenna of the plurality of stationary reader antennas.

* * * * *